United States Patent [19]

Kavanagh et al.

[11] 3,805,286

[45] Apr. 16, 1974

[54] TAPE VELOCITY DETECTOR

[75] Inventors: Thomas S. Kavanagh; William H. Bunker, both of Boulder, Colo.

[73] Assignee: Storage Technology Corporation, Boulder, Colo.

[22] Filed: Feb. 1, 1973

[21] Appl. No.: 328,730

[52] U.S. Cl. .................................... 360/51, 360/73

[51] Int. Cl. ........................................... G06f 11/00

[58] Field of Search .............. 340/174.1 A, 174.1 B; 178/6.6 P; 179/100.2 S; 235/92 DN

[56] References Cited

UNITED STATES PATENTS 2,876,004 3/1959 Sink ............................ 340/174.1 A

*Primary Examiner*—Bernard Konick
*Assistant Examiner*—Stewart Levy
*Attorney, Agent, or Firm*—Woodcock, Washburn, Kurtz & Mackiewicz

[57] ABSTRACT

In a magnetic recording and playback system a detector indicates the velocity of the magnetic tape. The number of data bits read back in a given interval of time is compared with a preset number. If the number of data bits counted exceeds the preset number, it is an indication of slippage between the capstan and magnetic tape.

A tachometer generates tachometer pulses related to the speed of the capstan. Data bits read back between successive tachometer pulses decrement a counter which is preset at the beginning of each tachometer period with a given count. If the counter is decremented through zero during any tachometer period, a signal indicating possible tape slippage (tape velocity slow) is produced. The number of counts remaining in the counter at the end of each interval is compared with another preset number to determine whether the tape velocity is too high.

3 Claims, 10 Drawing Figures

TAPE VELOCITY DETECTOR

BACKGROUND OF THE INVENTION

This invention relates to magnetic recording and playback systems and more particularly to a detector for indicating tape velocity in such a system.

Modern high speed magnetic tape units require rapid acceleration of the tape to achieve desired performance. Examples of such magnetic tape systems are shown in U.S. Pat. Nos. 3,664,604, REEL CONTROL SYSTEM FOR MAGNETIC TAPE APPARATUS, Jesse I. Aweida et al.; 3,662,365, DYNAMIC AMPLITUDE CONTROL FOR MAGNETIC TAPE SYSTEMS, Juan Rodriquez, Roger A. Monroe; and 3,618,119, COMPENSATION IN A MAGNETIC WRITE CIRCUIT, Juan Rodriquez.

In such tape units, the tape may accelerate from zero to 250 inches per second in less than 2.2 milliseconds. Normally, there is no problem in such acceleration. However, it is possible that a reduction in the coefficient of friction of the driving capstan surface can occur due to dirt, wear, and other environmental conditions over a period of time. If and when the friction characteristics of the capstan become substantially altered, a slippage can occur during the acceleration of the type of the capstan. Such slippage will cause an erroneous recording of data. It is desirable to have an indicator which will reliably indicate when the tape velocity is too low due to slippage.

SUMMARY OF THE INVENTION

In accordance with this invention an indication of tape velocity is obtained by counting the number of data bits read back in a given interval of time. This number is compared to a given range and when the number is outside of this range, there is an indication of tape velocity error.

Further in accordance with this invention the data bits played back between capstan tachometer pulses are counted. If the number of data bits exceeds a predetermined number, an indication of slippage between the capstan and the tape is produced.

In accordance with another aspect of this invention, the data bits decrement a counter which is preset with a given number upon the occurence of each tachometer pulse. If the counter is decremented through zero before the next occuring tachometer pulse, a signal indicating tape slippage is produced. At the end of each tachometer interval, the number remaining in the counter is transferred to a comparator where it is compared with another preset number. If the count remaining in the comparator exceeds this other preset number, an error signal is produced indicating that the tape velocity is too high.

It is an important object of this invention to provide a velocity detector which is universally applicable to magnetic tape units having different recording speeds.

The foregoing and other objects, features and advantages of the invention will be better understood from the following more detailed description and appended claims.

DESCRIPTION OF THE DRAWINGS

FIGS. 3A and 3B together show a logic diagram of the detector; and

DESCRIPTION OF A PARTICULAR EMBODIMENT

Figure 1:
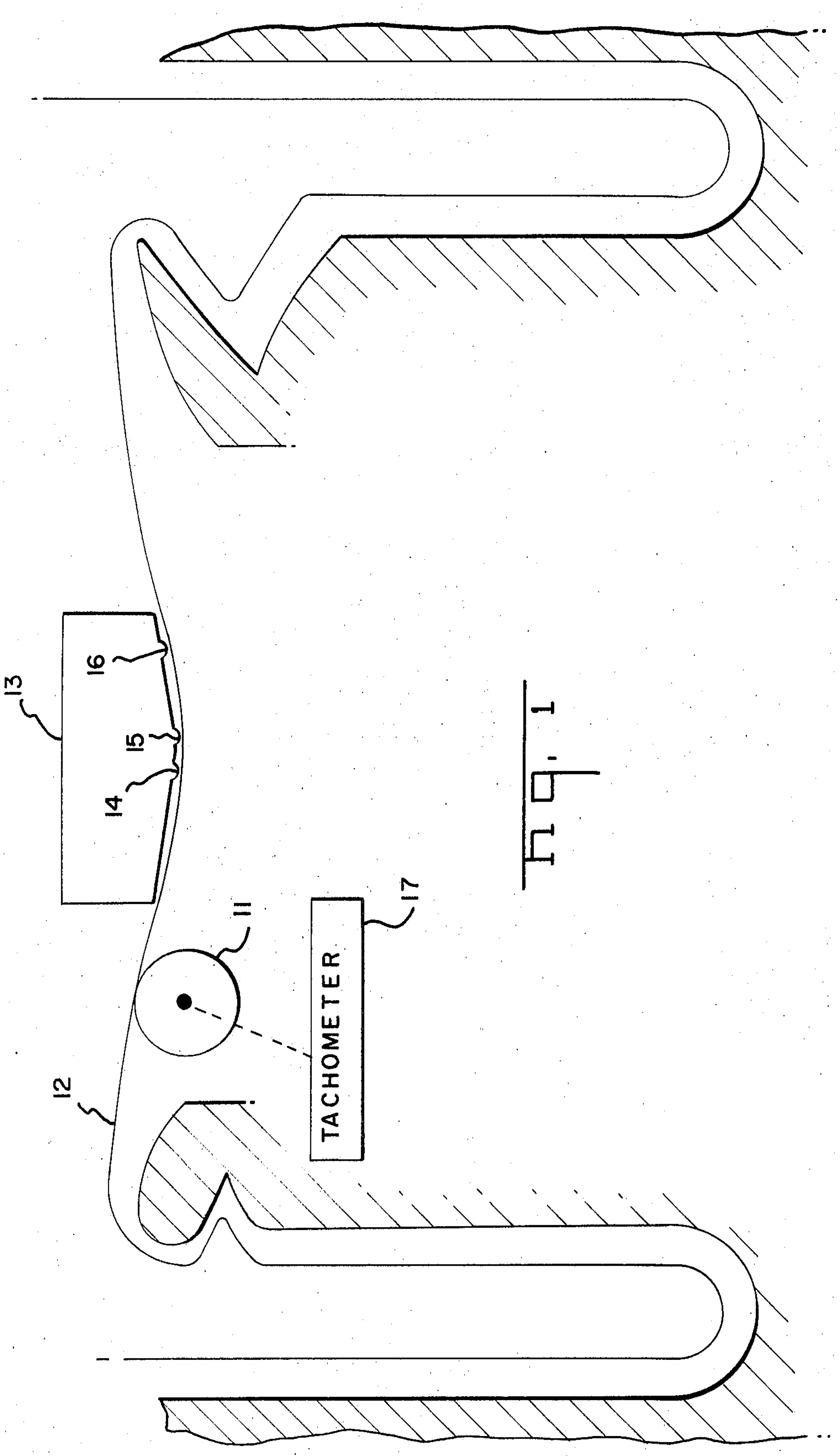
FIG. 1 depicts a magnetic tape unit.

FIG. 1 depicts a high speed magnetic tape recording and playback system in which a capstan 11 drives magnetic tape 12 past a magnetic head 13. Head 13 includes a read head gap 14, a write head gap 15 and an erase head gap 16.

A digital tachometer 17 is driven by the capstan motor shaft. A typical tachometer produces 500 impulses per revolution of the motor shaft. Timing between these pulses is an indication of the speed of the capstan and therefore is used as a signal to accurately control capstan motor speed.

Since the circumference of the driving capstan is known, counting the tachometer pulses measures the amount of tape moved by the capstan past the head. This capability is used to accurately measure a predetermined amount of tape where no recording takes place. This creates an interblock gap at the beginning of each recorded block of data bits. As soon as the proper amount of tape passes the magnetic head to create an interblock gap, an "allow write" signal is generated which allows the data to be recorded on the tape.

Figures 2A, 2B, 2C, 2D, 2E:
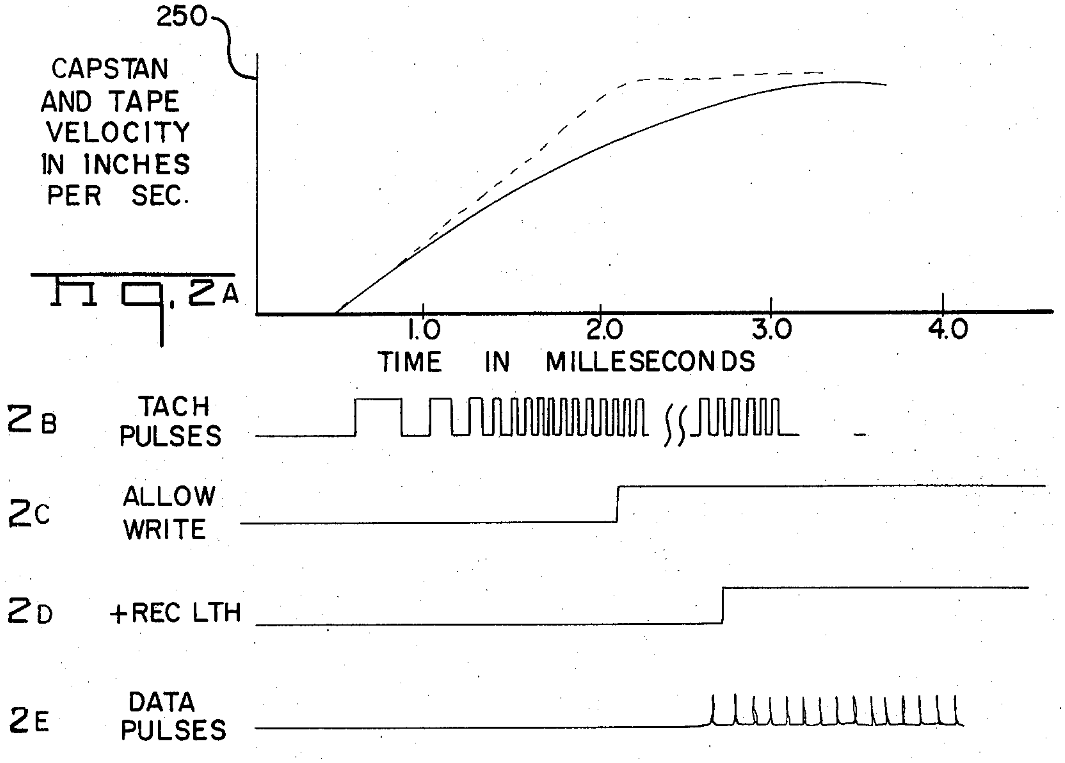
FIGS. 2A–2E are wave forms depicting the operation of the system.

FIG. 2B shows the generated tachometer pulses. As soon as a given number of tachometer pulses have been counted, an allow write signal is produced as shown in FIG. 2C. In FIG. 2A the dashed line depicts the capstan velocity. It can be seen that the allow write signal is produced when the capstan velocity reaches the desired level of 250 inches per second.

Data bits are read back after recording to check their validity. Due to the spacing between the write head gap 14 and the read head gap 15, the read back takes place a short interval of time after the recording. FIG. 2E depicts the read back data pulses which begin slightly after the allow write signal. At a recording speed of 250 inches per second this time is approximately 0.6 milliseconds.

Figure 4A:
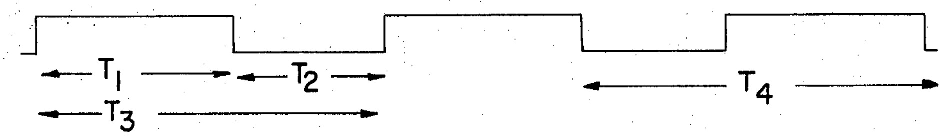
FIGS. 4A and 4B are wave forms showing the tachometer and data pulses.
Figure 4B:
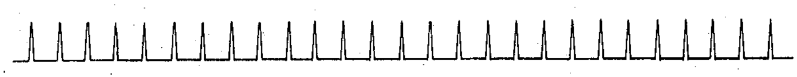
Figure 7A:
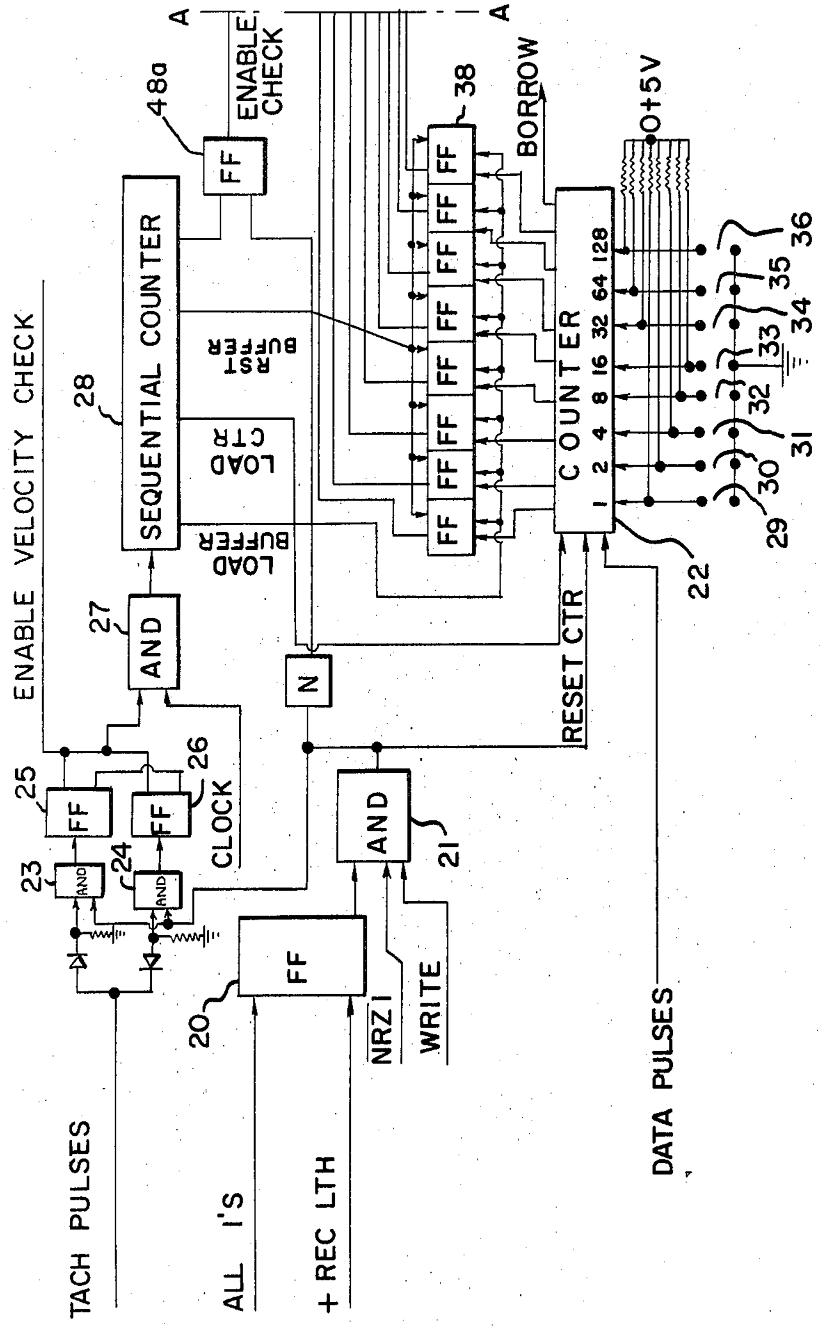
Figure 7B:
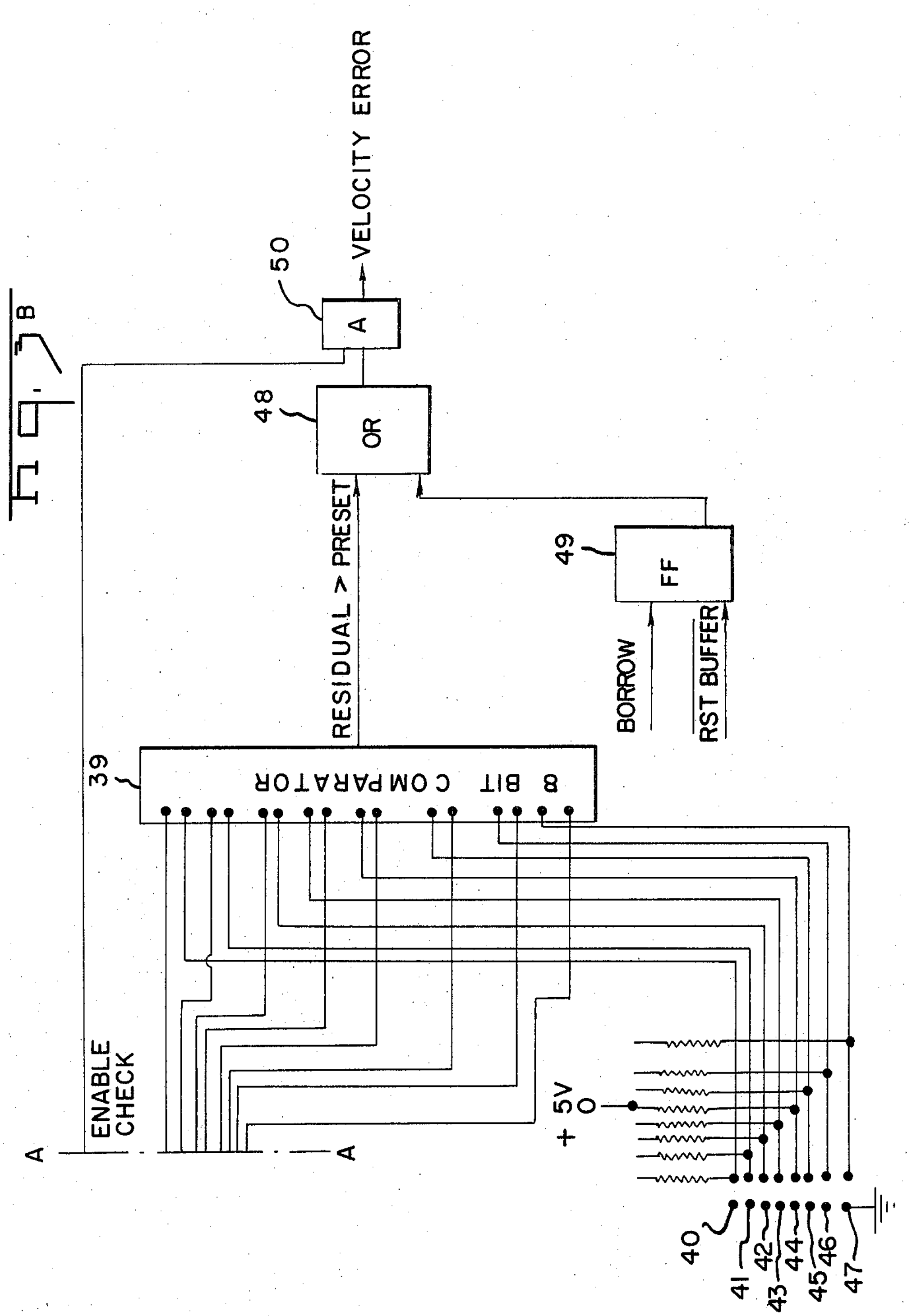

Since the recording rate is precisely controlled, and since the speed of the capstan is precisely controlled, there is a fixed ratio of recorded data bits per tachometer period. FIG. 4A shows the tachometer pulses and FIG. 4B shows data pulses. The number of data pulses per tachometer period should be constant. This invention is applicable to all of the recording densities which are presently used. These include 800, 1600 and 3200 or more bits per inch. At 1600 bits per inch, with a capstan diameter of 2.32 inches and a tachometer with five hudnred pulses per revolution the number of recorded data bits per tachometer period is 23.6.

In accordance with this invention the number of recorded data bits read by the read head in each tachometer period is counted. If a change in velocity occurs between the times the bits are recorded on tape by the write head and read back by the read head, or if for any reason the bits are written at the wrong density, the number of read back data bits counted during a tachometer period will not be correct.

Consider FIG. 2A where the solid line represents tape velocity and the dashed line represents capstan velocity. The capstan reached the proper velocity of 250 inches per second and the allow write signal was generated at this time, approximately 2.2 milliseconds. However, at this time, because of slippage, the tape velocity is only about 75 percent of nominal velocity. Because of this, the recorded bits are written closer together than normal. Approximately 0.6 milliseconds later, when these bits are read by the read head, the tape is moving at 90 percent of nominal velocity. This results in 15 percent more recorded bits being counted per tachometer period than is normal. By counting these bits, this invention provides an error indication.

The logic circuitry for detecting this velocity error is shown in FIGS. 3A and 3B. A flip-flop 20 is set when the read head detects the beginning of a record during the read back check. That is, the flip-flop 20 is set by the signal + REC LTH. The system is described as applied to the detection of phase encoded data. Therefore, the signal $\overline{\text{NRZI}}$ is ANDed with the output of flip-flop 20. The write signal is also applied to the AND gate 21 to produce a signal which resets the decrementing counter 22. This signal also enables AND gates 23 and 24 which detect the tachometer pulses.

A set of storage elements which includes the flip-flops 25 and 26 detects the first transition of the tachometer pulses after flip-flop 20 has been set. If the first transition in the tachometer pulses line is a positive going transition, flip-flop 25 is set; if the first transition is negative the flip-flop 26 is set. The circuitry stores the direction of the first transition.

The reason for this is best explained with reference to FIG. 4A. The tachometer period is accurate from rise to rise or fall to fall. That is, the time T3 equals the time T4. But the time T1 does not necessarily equal time T2. Because of this, a complete tachometer period must be used to measure the rate of the recorded data read by the read head. By detecting the first tachometer transition, either plus to minus or minus to plus, the velocity check logic starts checking the velocity of the recorded data as soon as possible after flip-flop 20 has been set. This allows a velocity check on a short length record.

Upon the occurrence of the first tachometer transition after flip-flop 20 is set, the AND gate 27 is enabled. It passes clock pulses to the sequential counter 28 which produces control pulses which perform the following functions:

1. Transfer contents of counter 22 to buffer 38 with the LOAD BUFFER pulse.
2. Load decrementing counter 22 with a preset number with the LOAD COUNTER pulse.
3. Reset buffer 38 with the RESET BUFFER pulse.
4. Turn on flip-flop 48a to allow error checking of subsequent tachometer transitions. The purpose of this F.F. is to disregard the possible erroneous value in the counter on the initial tachometer transition.

The number initially set in counter 22 is determined by the jumpers which are connected across the terminals 29–36. For example, by installing jumpers across the terminals 29, 31, 34, 35 and 36 a count of 26 will be loaded into the counter 22 at the beginning of each tachometer period.

The counter 22 is decremented by each data pulse which occurs during the tachometer period. The value left in this counter at the end of the tachometer period indicates the velocity of the tape during the tachometer period.

At the end of the tachometer period a LOAD BUFFER signal transfers the remaining count in counter 22 to the buffer 38.

Comparator 39 compares the residual count in buffer 38 with a preset number. This preset number is determined by installing jumpers across the selected terminals 40–47. For example, by installing jumpers across terminals 40, 41, 42, 43, 44 and 46, a predetermined count of five is applied to comparator 39. The comparator 39 produces an output if the residual count in counter 38 is greater than the preset number. This signal is applied through gate 48 to indicate a velocity error.

Another velocity error is indicated if the counter 22 counts through zero during any tachometer period. This produces a BORROW signal. The flip-flop 49 is set by the BORROW signal to indicate whether the counter 22 has gone through zero during any given tachometer period. The output of flip-flop 49 is applied to OR gate 48 to produce a velocity error signal. The velocity error signal is produced by the AND gate 50 which is enabled during a tape start in the ENABLE CHECK signal.

The operation of the detector is as follows. Assume that the tape speed is such that there is an expected 23.6 recorded data bits during each tachometer period and that the desired tolerance range is plus or minus 10 percent. The allowable range for the number of recorded data pulses per tachometer period will be 21 to 26. By installing jumpers across terminals 29, 31, 34, 35 and 36 a value of 26 is loaded into counter 22 each time a tachometer pulse is detected. Counter 22 is decremented by each data pulse detected by the read head. At the end of the tachometer period counter 22 should have a residual count between zero and five.

By installing jumpers across terminals 40, 41, 42, 43, 44 and 46, a preset count of five is applied to the comparator 39. If the residual count of the counter 22 is between zero and five, the output of comparator 39 is down. Further, because the counter 22 has not counted through zero, there is not a BORROW signal. Therefore, no velocity error is produced from OR gate 48. This indicates that the number of data pulses read during the tachometer period was within the allowable range.

By proper selection of jumpers 29–36 and 40–47, nonsymmetrical ranges about the nominal value can be checked. As an example, the range can be plus 10 percent minus 15 percent. In this case, a value of 26 would be loaded into counter 22 by installing jumpers 29, 31, 34, 35 and 36. The range of the residual count would be zero to six. Therefore, a preset count of six would be applied to comparator 39 by installing jumpers 40, 41, 42, 43, 44 and 47.

While a particular embodiment of the invention has been shown and described, it will be understood that various other modifications are within the true spirit and scope of the invention. The appended claims are intended to cover such modifications.

What is claimed is:

1. In a magnetic recording and playback system in which bits are recorded on and played back from magnetic tape, said system including means for recording bits on said magnetic tape, means for reading the recorded bits and a capstan for driving said tape past said means for recording and means for reading, a detector for indicating the velocity of said magnetic tape comprising:

a tachometer connected to said capstan, said tachometer producing tachometer pulses spaced in time, and having a period between pulses, varying in relation to the speed of said capstan, a counter for counting said bits, means for controlling said counter in response to said tachometer pulses so that the count in said counter represents the total number of said bits received by said counter within said tachometer pulse period, a comparator for comparing the number of bits counted in said time intervals with a preset number, and means for generating a velocity error signal when said number is outside of a given range.

2. The system recited in claim 1 wherein said counter is a decrementing counter, means to preset said counter to a given count on successive tachometer pulses, means for decrementing said counter by one count for each bit in each of said time intervals, and means for generating a velocity error signal representing tape slippage when said counter is counted through zero during any interval.

3. The detector recited in claim 2 further comprising:

means for generating a signal representing a predetermined count, and means for comparing the count remaining in said decrementing counter at the end of each interval with said predetermined count, said comparator producing an error signal if the count remaining in said counter is greater than said predetermined count.

* * * * *

PO-1050
(5/69)

UNITED STATES PATENT OFFICE

CERTIFICATE OF CORRECTION

Patent No. 3,805,286 Dated April 16, 1974

Inventor(s) Thomas S. Kavanagh et al

It is certified that error appears in the above-identified patent and that said Letters Patent are hereby corrected as shown below:

Column 1, line 26, "type" should read --tape--;
line 27, "of" should read --by--.
Column 3, line 29, "pulses" should read --pulse--.

Signed and sealed this 17th day of September 1974.

(SEAL)
Attest:

McCOY M. GIBSON JR.
Attesting Officer

C. MARSHALL DANN
Commissioner of Patents